(12) United States Patent
Higby

(10) Patent No.: US 7,095,941 B2
(45) Date of Patent: Aug. 22, 2006

(54) FUSED OPTICAL FIBER OPTICAL DEVICE SYSTEM

(75) Inventor: Paige Higby, Holland, MA (US)

(73) Assignee: Schott Corporation, Elmsford, NY (US)

( * ) Notice: Subject to any disclaimer, the term of this patent is extended or adjusted under 35 U.S.C. 154(b) by 0 days.

(21) Appl. No.: 10/973,239

(22) Filed: Oct. 27, 2004

(65) Prior Publication Data

US 2006/0088269 A1    Apr. 27, 2006

(51) Int. Cl.
*G02B 6/00* (2006.01)
*G02B 6/02* (2006.01)

(52) U.S. Cl. .................. 385/142; 385/123; 385/141
(58) Field of Classification Search ................. 385/141, 385/142, 144
See application file for complete search history.

(56) References Cited

U.S. PATENT DOCUMENTS

| | | | |
|---|---|---|---|
| 3,561,986 A | 2/1971 | Broemer et al. | |
| 3,650,780 A | 3/1972 | Connelly | |
| 3,801,336 A | 4/1974 | Upton | |
| 3,879,207 A | 4/1975 | Hartman | |
| 3,958,999 A | 5/1976 | Izumitani et al. | |
| 3,999,996 A | 12/1976 | Faulstich et al. | |
| 4,128,432 A | 12/1978 | Komorita et al. | |
| 4,194,807 A * | 3/1980 | Gliemeroth | 385/124 |
| 4,472,511 A | 9/1984 | Mennemann et al. | |
| 4,913,518 A * | 4/1990 | Fine | 385/115 |
| 4,932,752 A * | 6/1990 | Krashkevich et al. | 385/142 |
| 5,358,666 A | 10/1994 | Sasaki | |
| 6,088,165 A * | 7/2000 | Janeczko et al. | 359/629 |
| 6,187,702 B1 | 2/2001 | Morishita | |
| 6,235,667 B1 | 5/2001 | Paloschi et al. | |
| 6,251,813 B1 | 6/2001 | Sato | |
| 6,333,288 B1 | 12/2001 | Clement et al. | |
| 6,468,935 B1 | 10/2002 | Mori et al. | |
| 6,514,892 B1 | 2/2003 | Kasai et al. | |
| 6,589,894 B1 | 7/2003 | Mito et al. | |
| 6,645,894 B1 | 11/2003 | Endo | |
| 6,690,869 B1 * | 2/2004 | Dohmen et al. | 385/123 |
| 2001/0001021 A1 | 5/2001 | Kraus | |
| 2002/0006857 A1 | 1/2002 | Tachiwama et al. | |
| 2003/0072554 A1 * | 4/2003 | Dohmen et al. | 385/142 |
| 2003/0142397 A1 | 7/2003 | Ando et al. | |
| 2004/0023787 A1 | 2/2004 | Wolff | |

FOREIGN PATENT DOCUMENTS

WO    WO 0039039    7/2000

* cited by examiner

*Primary Examiner*—Brian Healy
*Assistant Examiner*—Charlie Peng
(74) *Attorney, Agent, or Firm*—Miller, White, Zelano & Branigan, P.C.

(57) ABSTRACT

A fused optical fiber optical device system comprises at least one optical component comprising optical fibers and at least one other optical component with which light transmitted in the optical fibers interacts, wherein the optical fiber comprises a core glass of the following composition: $La_2O_3$ 1–23 mole %, $ZrO_2$ 1–10 mole %, $WO_3 \geq 2.5$ mole %, ZnO 1–15 mole %, BaO 0–9 mole %, $B_2O_3$ 20–70 mole %, $Ta_2O_5$ 0–3 mole %, CaO 0–7 mole %, PbO 6–35 mole %, $SiO_2$ 0–40 mole %, $As_2O_3$ and/or $Sb_2O_3$ 0–0.1 mole %, $Nb_2O_5$ 0–3 mole % and $Al_2O_3$ 0–8 mole %. The core glass is essentially free of CdO, has a refractive index $n_d$ of at least 1.8 and a CTE of $\geq$ about $74 \times 10^{-7}$.

32 Claims, No Drawings

FUSED OPTICAL FIBER OPTICAL DEVICE SYSTEM

Fiber optics deals with the transmission of light through small filamentary optical materials or fibers. Typically, the fibers comprise a central core and an outer surrounding cladding along the entire length of the fiber. The transmission of light through the fiber is based on the phenomenon of total internal reflection. For total internal reflection, the refractive index (n) of the core must be greater than the refractive index of the cladding. Depending on the application, the materials used to fabricate the optical fiber vary. A large difference of refractive index between core glass and cladding glass is generally desirable.

SUMMARY OF THE INVENTION

The present invention relates to the field of fused optical fiber optical device systems and more particularly to a device comprising a high refractive index optical fiber.

More particularly, the invention relates to a fused optical fiber optical device system having at least one optical component comprising optical fibers and at least one other optical component with which light from said optical fibers interacts.

In a preferred embodiment the optical fibers have a core glass which has a refractive index of at least 1.8, and a coefficient of thermal expansion (CTE) of $\geq 74\times10^{-7}$, is essentially free of CdO and has the following composition in mole %:

| | |
|---|---|
| $La_2O_3$ | 1–23 |
| $ZrO_2$ | 1–10 |
| $WO_3$ | $\geq 2.5$ |
| ZnO | 1–15 |
| BaO | 0–9 |
| $B_2O_3$ | 20–70 |
| $Ta_2O_5$ | 0–3 |
| CaO | 0–7 |
| PbO | 6–35 |
| $SiO_2$ | 0–40 |
| $As_2O_3$ and/or $Sb_2O_3$ | 0–0.1 |
| $Nb_2O_5$ | 0–3 and |
| $Al_2O_3$ | 0–8. |

In another preferred embodiment the core glass of the optical fibers has a refractive index of at least 1.8, and a CTE of $\geq 74\times10^{-7}$, is essentially free of CdO and PbO and has the following composition in mole %:

| | |
|---|---|
| $La_2O_3$ | 1–23 |
| $ZrO_2$ | 1–10 |
| $WO_3$ | $\geq 2.5$ |
| $Ta_2O_5$ | 0–3 |
| ZnO | 1–15 |
| BaO + CaO | $\geq 4$ |
| $B_2O_3$ | 20–70 |
| $Ta_2O_5$ | 0–3 |
| $SiO_2$ | 0–40 |
| $As_2O_3$ and/or $Sb_2O_3$ | 0–0.1 |
| $Nb_2O_5$ | 0–3 and |
| $Al_2O_3$ | 0–8. |

In yet another preferred embodiment the core glass of the optical fibers has a refractive index of at least 1.8, and a CTE of $\geq 74\times10^{-7}$, is essentially free of CdO, PbO and $Ta_2O_5$ and has the following composition in mole %:

| | |
|---|---|
| $La_2O_3$ | 1–23 |
| $ZrO_2$ | 1–10 |
| $WO_3$ | $\geq 2.5$ |
| ZnO | 1–15 |
| BaO + CaO | $\geq 4$ |
| $B_2O_3$ | 20–70 |
| $SiO_2$ | 0–40 |
| $As_2O_3$ and/or $Sb_2O_3$ | 0–0.1 |
| $Nb_2O_5$ | 0–3 and |
| $Al_2O_3$ | 0–8. |

In yet another preferred embodiment the core glass of the optical fibers has a refractive index of at least 1.8, and a CTE of $\geq 74\times10^{-7}$, is essentially free of CdO and $Y_2O_3$ and has the following composition in mole %:

| | |
|---|---|
| $La_2O_3$ | 1–23 |
| $ZrO_2$ | 1–10 |
| $WO_3$ | $\geq 2.85$ |
| ZnO | 1–15 |
| BaO | 0–9 |
| $B_2O_3$ | 20–70 |
| CaO | 0–7 |
| PbO | 5–35 |
| $SiO_2$ | 0–40 |
| $As_2O_3$ and/or $Sb_2O_3$ | 0–0.1 |
| $Nb_2O_5$ | 0–3 |
| $Al_2O_3$ | 0–8 and |
| $Ta_2O_5$ | 0–2.9. |

In addition to cadmium free compositions, it is also preferred in this invention to provide systems with reduced or absent contents of arsenic, lead, yttrium and tantalum. The glass compositions of use in the cores of the optical fiber systems of the present invention advantageously significantly decrease or eliminate the levels of oxides of lead, yttrium, tantalum, arsenic and/or cadmium found in traditional core glass compositions without any significant adverse effects on optical and physical properties.

Good fusibility and meltability of the core glass compositions of use in the optical fiber systems of the present invention are achieved by balanced proportions of glass formers (e.g., $SiO_2$, $B_2O_3$) in relation to the poorly melting highly refractive components (e.g., BaO, CaO, $WO_3$, $ZrO_2$).

The core glass compositions used in the present invention preferably contain about 20–70 mole % of the main glass former $B_2O_3$, particularly preferably about 25–50 mole %, and most preferably about 30–40 mole %. Another glass former, $SiO_2$, is present in amounts of about 0–40 mole %. Most preferably, the compositions contain about 9–15 mole % of $SiO_2$.

Tungsten oxide $WO_3$ is present in an amount of $\geq 2.5$ mole % in the glass and, in addition to the fine adjustment of the optical position, tungsten oxide serves to further reduce the tendency towards crystallization in a glass system. A $WO_3$ content of $\geq 2.5$ by mole is preferred, particularly preferably $\geq 2.75$ mole % and most preferably $\geq 2.85$ mole %. Typically the amount of $WO_3$ is less than 6 mole %.

The core glass compositions of use in the present invention preferably contain $\leq 3$ mole % of $Ta_2O_5$, preferably about 0–2 mole %, particularly preferably about 0–1.5 mole % and for certain embodiments are preferably $Ta_2O_5$ free. In certain embodiments, the maximum sum of $WO_3+Ta_2O_5$ taken together is preferably about 3.5–10 mole %, most preferably about 3.5–7.5 mole %.

For stabilization of crystallization and durability, the core glasses may contain a $ZrO_2$ content of about 1–10 mole %, preferably about 5–10-mole % and most preferably about 6–9 mole %.

For increasing the refractive index and enhancement of dispersion characteristics, a BaO content of about 0–9 mole % is preferred, particularly preferably about 0–5 mole % and most preferably about 2–4.50 mole %. A $La_2O_3$ content of about 1–23 mole % is preferred, particularly preferably about 5–15 mole % and most preferably about 7–13 mole %.

In general, $Sb_2O_3$ can be used in place of or in combination with $As_2O_3$, and is especially useful when $As_2O_3$ is absent. $Sb_2O_3$ is typically used in amounts of 0–0.1 mole %.

Preferably, the alkaline-earth components CaO and BaO taken together comprise $\geq 4$ mole %, particularly preferably $\geq 6$ mole %, and most preferably $\geq 8$ mole %. Typically the amount of CaO+BaO is less than 16 mole %. In certain embodiments niobium oxide can be used advantageously to increase refractive index of the glass and improve its durability. A $Nb_2O_5$ content of about 0–3 mole % is preferred, particularly preferably about 0–2 mole % and especially 0–1 mole %. According to another aspect of the present invention, the novel core glass compositions of use in the optical fiber system of the present invention have a CTE of $\geq 74 \times 10^{-7}$, particularly preferably a CTE of $\geq 75 \times 10^{-7}$ and most preferably a CTE of $\geq 76 \times 10^{-7}$, e.g., around 76, 77, 78, 79, 80, etc. According to another aspect, the refractive index (sodium d-line, 589.29 nm) is at least 1.8, e.g., about any of 1.800, 1.805, 1.801, 1.815, 1.820, 1.825, 1.830, 1.835, etc.

All the glass fiber components of this invention can be prepared conventionally. Typically, core glass rods are drawn from molten liquid having the desired composition. An alternative is to mold the molten liquid in special molds. Light transmission optical fibers can be manufactured by means of the preferred core glass compositions disclosed herein and an appropriate cladding glass in accordance with known methods (e.g., a double crucible method or a rod-in-tube method). A bundle of fibers can be made from a plurality of glass fibers. By twisting a bundle of fibers, a twister is obtained. This twister rotates the image coming from, for example, a photomultiplier and can be used in, e.g., night-vision telescopes. Methods for cladding core glasses, drawing rods, assembling bundles etc. are all conventional, e.g., see W. B. Allan, Fibre Optics, Theory and Practice, Plenum press 1973; J. Wilbur Hicks, Jr. and Paul Kiritsy, "Fiber Optics", Glass Industry April–May 1962; J. Hecht, Understanding Fiber Optics, Prentice Hall, 1999.

The glass composition ranges according to the invention offer a group of cadmium-free optical core glasses, which have improved properties. With these properties, especially with their optical positions, the resultant optical fibers are outstandingly suitable for use in the optical applications of, for example, tapers for X-ray imaging, crystallography, protein crystallography, astronomical imaging arrays, transfer windows, cell phones, sensors e.g., biometric, night vision technology, e.g., goggles, telescopes, telescope optics, etc., beam splitter technology, e.g., beam splitters, etc., imaging, e.g., transmission tapers, twisters, etc. projection, telecommunication and laser technology, etc., where, other than as specified herein, they are employed conventionally.

The fused optical fiber optical device systems of this invention include systems routinely found in such applications, often including one or more of light sources, lenses, windows, beam splitters, reflective or transmissive surfaces, optical detectors (CCD's etc.), detector arrays, phosphor coatings, bandpass filters, sensor arrays, filter coatings, multi-channel plates, microprocessors, display elements (LCD, LED, etc.), etc. The optical fiber components of this invention can be used together with such components or as part of such components, etc. Such configurations are conventional [See e.g., T. Gibson, "Seeing in the Dark" American Heritage of Invention and Technology, 14(1) pp 47–54 (1998); I. P. Csorba, (book) Image Tubes, Sams &Co. (1985)].

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by mole %, unless otherwise indicated.

EXAMPLES

Glasses according to the invention are produced from customary raw materials by melting. Tables 1–3 show the respective composition (in mole %, based on oxide), the refractive index $n_d$, the CTE and the glass transition temperature $T_g$ [° C.] of the example glasses.

TABLE 1

|  | 1 | 2 | 3 | 4 | 5 | 6 |
|---|---|---|---|---|---|---|
| $La_2O_3$ | 10.99% | 11.14% | 11.14% | 11.14% | 11.14% | 11.14% |
| $ZrO_2$ | 6.13% | 6.21% | 6.21% | 6.21% | 6.21% | 6.21% |
| $WO_3$ | 2.86% | 2.89% | 2.89% | 2.89% | 2.89% | 2.89% |
| ZnO | 12.86% | 11.85% | 11.85% | 11.85% | 11.85% | 11.85% |
| BaO | 5.49% | 4.24% | 4.24% | 4.24% | 4.24% | 4.24% |
| $B_2O_3$ | 36.96% | 35.97% | 36.43% | 36.43% | 36.42% | 36.43% |
| $Ta_2O_5$ | 2.99% | 2.63% | 2.33% | 2.23% | 2.03% | 1.72% |
| CaO | 4.79% | 4.86% | 4.86% | 4.86% | 4.86% | 4.86% |
| PbO | 4.82% | 8.08% | 8.44% | 8.61% | 9.07% | 9.76% |
| $SiO_2$ | 12.05% | 12.07% | 11.55% | 11.48% | 11.23% | 10.84% |
| $As_2O_3$ | 0.06% | 0.06% | 0.06% | 0.06% | 0.06% | 0.06% |
| Ref. Index measurement | 1.80962 |  |  |  | 1.8171 | 1.8193 |
| Ref. Index Becke Line at SFO | 1.79 | 1.785 | 1.785 | 1.805 | 1.805 |  |
| dispersion | 39.56 |  |  |  | 37.88 |  |

TABLE 1-continued

|  | 1 | 2 | 3 | 4 | 5 | 6 |
|---|---|---|---|---|---|---|
| CTE (×10⁻⁷) | 75.7 |  |  |  | 76.6 | 76.7 |
| Tg (° C.) | 598 |  |  |  | 581 | 577 |
| Soft. Pt. (° C.) | 692 |  |  |  | 680 |  |
| Strain Pt. (° C.) |  |  |  |  | 542 | 545 |
| Anneal Pt. (° C.) |  |  |  |  | 572 | 575 |
| Working Pt. (° C.) |  |  |  |  |  |  |
| Knoop Hard. |  |  |  |  |  |  |
| Density (g/cm³) |  |  |  |  |  |  |

TABLE 2

|  | 7 | 8 | 9 | 10 | 11 | 12 | 13 |
|---|---|---|---|---|---|---|---|
| $La_2O_3$ | 11.14% | 11.14% | 11.13% | 11.14% | 10.99% | 11.14% | 10.99% |
| $ZrO_2$ | 6.21% | 6.21% | 6.75% | 6.21% | 6.13% | 6.21% | 6.25% |
| $WO_3$ | 2.89% | 2.89% | 2.89% | 2.89% | 2.85% | 2.89% | 2.85% |
| ZnO | 11.85% | 11.85% | 11.36% | 11.86% | 12.86% | 11.85% | 12.86% |
| BaO | 4.24% | 4.24% | 4.24% | 4.24% | 5.49% | 4.24% | 7.00% |
| $B_2O_3$ | 36.42% | 36.43% | 36.42% | 36.43% | 38.14% | 36.43% | 37.30% |
| $Ta_2O_5$ | 1.42% | 1.11% | 0.91% | 0.91% | 2.99% | 1.42% | 2% |
| CaO | 4.86% | 4.86% | 4.86% | 4.86% | 4.79% | 4.86% | 5.49% |
| PbO | 10.47% | 11.08% | 11.45% | 11.07% | 0.00% | 10.13% | 0.00% |
| $SiO_2$ | 10.44% | 10.13% | 9.93% | 10.33% | 13.20% | 10.77% | 12.70% |
| $As_2O_3$ | 0.06% | 0.06% | 0.06% | 0.06% | 0.06% | 0.06% | 0.06% |
| $Nb_2O_5$ |  |  |  |  | 2.50% |  | 1.20% |
| Ref. Index measurement | 1.8182 |  |  |  | 1.817 | 1.817 | 1.818 |
| Ref. Index Becke Line at SFO dispersion | 1.805 | 1.815 |  | 1.808 |  | 1.805 |  |
| CTE (×10⁻⁷) | 77.0 |  |  | 70.94 |  | 76.7 | 73.55 |
| Tg (° C.) | 578 |  |  |  |  | 575 |  |
| Soft. Pt. (° C.) |  |  |  |  |  | 670 |  |
| Strain Pt. (° C.) |  |  |  |  |  | 576 |  |
| Anneal Pt. (° C.) | 543 |  |  |  |  | 590 |  |
| Working Pt. (° C.) | 573 |  |  |  |  | 781 |  |
| Knoop Hard. |  |  |  |  |  | 600 |  |
| Density (g/cm³) |  |  |  |  |  | 4.847 |  |

TABLE 3

|  | 14 | 15 |
|---|---|---|
| $La_2O_3$ | 11.49% | 11.49% |
| $ZrO_2$ | 7.00% | 7.10% |
| $WO_3$ | 3.50% | 3.50% |
| ZnO | 12.86% | 13.16% |
| BaO | 6.80% | 6.80% |
| $B_2O_3$ | 37.30% | 37.50% |
| $Ta_2O_5$ | 0.00% | 0.00% |
| CaO | 5.79% | 5.79% |
| PbO | 0.00% | 0.00% |
| $SiO_2$ | 13.40% | 13.40% |
| $As_2O_3$ | 0.06% | 0.06% |
| $Nb_2O_5$ | 1.80% | 1.20% |
| Ref. Index measurement | 1.808 | 1.800 |
| CTE (×10⁻⁷) | 74.2 | 74.2 |

The glasses according to the invention are produced as follows: the raw materials for the oxides are weighed out. The refining agent or agents are added, and thorough mixing is carried out. The glass mixture is melted at about 1300° C. in a continuous Pt melting unit or 2I crucible, refined at about 1427° C. and thoroughly homogenized. At a pouring temperature of about 1149° C., the glass is poured and is processed to give the desired dimensions.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A fused optical fiber optical device system comprising at least one optical component comprising optical fibers and at least one other optical component with which light transmitted in said optical fibers interacts, wherein said optical fibers comprise a core glass of the following composition in mole %:

| $La_2O_3$ | 1–23 |
| $ZrO_2$ | 1–10 |
| $WO_3$ | ≧2.5 |
| ZnO | 1–15 |
| BaO | 0–9 |
| $B_2O_3$ | 20–70 |
| $Ta_2O_5$ | 0–3 |
| CaO | 0–7 |

-continued

| | |
|---|---|
| PbO | 6–35 |
| SiO$_2$ | 0–40 |
| As$_2$O$_3$ | 0–0.1 |
| Sb$_2$O$_3$ | 0–0.1 |
| Nb$_2$O$_5$ | 0–3 |
| Al$_2$O$_3$ | 0–8 | and essentially free of CdO
with a refractive index n$_d$ of at least 1.8 and
a CTE of $\geq 74 \times 10^{-7}$.

2. The optical device system of claim 1, wherein the amount of Ta$_2$O$_5$ is 0–2-mole %.

3. The optical device system of claim 2, wherein the amount of Ta$_2$O$_5$ is 0–1.5-mole %.

4. The optical device system of claim 1, wherein the amount of WO$_3$ is $\geq 2.75$ mole %.

5. The optical device system of claim 1, wherein the CTE is $\geq 75 \times 10^{-7}$.

6. The optical device system of claim 5, wherein the CTE is $\geq 76 \times 10^{-7}$.

7. The optical device system of claim 1, wherein the amount of PbO is about 9–35 mole %.

8. The optical device system of claim 7, wherein the amount of PbO is about 10–35 mole %.

9. The optical device system of claim 1 which is a night vision telescope.

10. The optical device system of claim 1 which comprises night vision goggles.

11. The optical device system of claim 1 which comprises a beam splitter.

12. The optical device system of claim 1, wherein the amount of BaO+CaO is about $\geq 4$ mole %.

13. The optical device system of claim 12, wherein the amount of BaO+CaO is about $\geq 6$ mole %.

14. The optical device system of claim 13, wherein the amount of BaO+CaO is about $\geq 8$ mole %.

15. The optical device system of claim 13, wherein the amount of WO$_3$+Ta$_2$O$_5$ is about 3.5–7.5 mole %.

16. The optical device system of claim 1, wherein the amount of SiO$_2$ is from 9–40 mole %.

17. The optical device system of claim 1, wherein said core glass has a refractive index n$_d$ consisting essentially of at least 1.8.

18. A fused optical fiber optical device system comprising at least one optical component comprising optical fibers and at least one other optical component with which light transmitted in said optical fibers interacts, wherein said optical fibers comprise a core glass of the following composition in mole %:

| | |
|---|---|
| La$_2$O$_3$ | 1–23 |
| ZrO$_2$ | 1–10 |
| WO$_3$ | $\geq 2.5$ |
| Ta$_2$O$_5$ | 0–3 |
| ZnO | 1–15 |
| BaO + CaO | $\geq 4$ |
| B$_2$O$_3$ | 20–70 |
| Ta$_2$O$_5$ | 0–3 |
| SiO$_2$ | 0–40 |
| As$_2$O$_3$ | 0–0.1 |
| Sb$_2$O$_3$ | 0–0.1 |
| Nb$_2$O$_5$ | 0–3 |
| Al$_2$O$_3$ | 0–8 | and essentially free of CdO and PbO
with a refractive index n$_d$ at least 1.8 and
a CTE of $\geq 74 \times 10^{-7}$.

19. The optical device system of claim 18, wherein the amount of Ta$_2$O$_5$ is about 0–2-mole %.

20. The optical device system of claim 19, wherein the amount of Ta$_2$O$_5$ is about 0–1.5-mole %.

21. The optical device system of claim 18, wherein the amount of WO$_3$ is $\geq$ about 2.75 mole %.

22. The optical device system of claim 18, wherein the CTE is $\geq$ about $75 \times 10^{-7}$.

23. The optical device system of claim 18, which is a night vision telescope.

24. The optical device system of claim 18, which comprises night vision goggles.

25. The optical device system of claim 18, wherein the amount of SiO$_2$ is from 9–40 mole %.

26. The optical device system of claim 18, wherein the amount of B$_2$O$_3$ is from 25–70 mole %.

27. A fused optical fiber optical device system comprising at least one optical component comprising optical fibers and at least one other optical component with which light transmitted in said optical fibers interacts, wherein said optical fibers comprise a core glass of the following composition in mole %:

| | |
|---|---|
| La$_2$O$_3$ | 1–23 |
| ZrO$_2$ | 1–10 |
| WO$_3$ | $\geq 2.5$ |
| ZnO | 1–15 |
| BaO + CaO | $\geq 4$ |
| B$_2$O$_3$ | 20–70 |
| SiO$_2$ | 0–40 |
| As$_2$O$_3$ | 0–0.1 |
| Sb$_2$O$_3$ | 0–0.1 |
| Nb$_2$O$_5$ | 0–3 |
| Al$_2$O$_3$ | 0–8 | and essentially free of CdO, PbO and Ta$_2$O$_5$
with a refractive index n$_d$ at least 1.8 and
a CTE of $\geq 74 \times 10^{-7}$.

28. The optical device system of claim 27, wherein the amount of WO$_3$ is $\geq$ about 2.75 mole %.

29. The optical device system of claim 27, wherein the CTE is $\geq$ about $75 \times 10^{-7}$.

30. The optical device system of claim 27 which is a night vision telescope.

31. The optical device system of claim 27 which comprises night vision goggles.

32. A fused optical fiber optical device system comprising at least one optical component comprising optical fibers and at least one other optical component with which light transmitted in said optical fibers interacts, wherein said optical fibers comprise a core glass of the following composition in mole %:

| | |
|---|---|
| La$_2$O$_3$ | 1–23 |
| ZrO$_2$ | 1–10 |
| WO$_3$ | $\geq 2.85$ |
| ZnO | 1–15 |
| BaO | 0–9 |
| B$_2$O$_3$ | 20–70 |
| CaO | 0–7 |
| PbO | 5–35 |
| SiO$_2$ | 0–40 |
| As$_2$O$_3$ | 0–0.1 |

-continued

| | |
|---|---|
| $Sb_2O_3$ | 0–0.1 |
| $Nb_2O_5$ | 0–3 |
| $Al_2O_3$ | 0–8 |
| $Ta_2O_5$ | 0–2.9 | and essentially free of CdO and $Y_2O_3$ with a refractive index $n_d$ at least 1.8 and a CTE of $\geqq 74 \times 10^{-7}$.

* * * * *